(12) United States Patent
Denisov

(10) Patent No.: US 11,319,026 B2
(45) Date of Patent: May 3, 2022

(54) HULL SURFACE AIR LUBRICATION STRUCTURE FOR MARINE VEHICLES

(71) Applicant: Alex Denisov, Mississauga (CA)

(72) Inventor: Alex Denisov, Mississauga (CA)

( * ) Notice: Subject to any disclaimer, the term of this patent is extended or adjusted under 35 U.S.C. 154(b) by 91 days.

(21) Appl. No.: 16/857,702

(22) Filed: Apr. 24, 2020

(65) Prior Publication Data

US 2021/0331769 A1 Oct. 28, 2021

(51) Int. Cl.
*B63B 1/38* (2006.01)

(52) U.S. Cl.
CPC .......... *B63B 1/38* (2013.01); *B63B 2001/387* (2013.01)

(58) Field of Classification Search
CPC ............................. B63B 1/38; B63B 2001/387
USPC ......................................................... 114/289
See application file for complete search history.

(56) References Cited

U.S. PATENT DOCUMENTS

| 2001/0022152 A1* | 9/2001 | Takahashi | ................. B63B 1/34 114/67 A |
| 2015/0013586 A1* | 1/2015 | Sancoff | ................... B63B 1/248 114/312 |

* cited by examiner

*Primary Examiner* — Anthony D Wiest
(74) *Attorney, Agent, or Firm* — Nasser Ashgriz; UIPatent Inc.

(57) ABSTRACT

The present invention is a device to reduce the skin friction drag on the hull surface of a marine vehicle. The device is in a form of a channel having a wider portion facing an incoming water stream (inlet) and a narrower portion (outlet) installed over an air orifice on the hull surface, forming an array of channels. A stream of water, generated by a marine vehicle motion, enters the channels and creates a low pressure region that pulls the air into the stream of water through the air intake holes, creating a stream of air bubbles. This structure increases water flow velocity close to each air orifice, creates larger turbulent components passing through and over each channel, injects more bubbles, and avoids dispersion of air bubbles to improve the existing skin friction drag.

20 Claims, 12 Drawing Sheets

HULL SURFACE AIR LUBRICATION STRUCTURE FOR MARINE VEHICLES

FIELD OF THE INVENTION

The present invention relates in general to improvement of the hydrodynamic properties of a hull of marine vehicle, and especially to drag reduction by means of air lubrication with air bubbles or micro-bubbles.

BACKGROUND OF THE INVENTION

The marine vehicles that move through the water experience a drag force.

Various types of drag forces exist, the main ones being: Skin Drag (drag due to friction between the water "carried along" with the hull and the rest of the water stream, Form Drag (drag due to turbulence created by the passage of the hull, and Wave Drag (drag created by the energy lost in creating waves).

One group of drag reducing techniques are related to control of the turbulent flow of water in the boundary layer near the hull of a marine vehicle. These techniques try to improve form drag by changing the turbulence and delaying a boundary layer separation, which results in large pressure losses. This is done either by manipulation of hull geometry or by introduction of various hull surface structures.

Another group of techniques for reducing drag of the marine vehicle use air lubrication. This works by creating a layer of air (air film) or a layer of separate air bubbles below the hull. This greatly improves skin drag and may reduce form drag as well. Air lubrication reduces the drag force on the wetted surfaces of the hull due to the lower viscosity of air compared to water. The choice of the method for air lubrication depends on the vessel specification and operating conditions.

Air lubrication systems can be divided into three main categories: Bubble Drag Reduction (BDR); Air Layer Drag Reduction; and Partial Cavity Drag Reduction (PCDR). Various developments have been made in these areas. BDR systems provide a significant reduction of drag. Most of the available BDRs target large ships moving in a straight line. They try to reduce fuel consumption for the shipping industry, but have clunky and expensive setup with air compressors, ducts, etc. that is not practical for a small boat.

One of the problems that any BDR has to address is a stability and control of air bubble curtain. After air bubbles are ejected from the nozzle(s) in the wetted area of the hull, their exact behavior is difficult to predict. Bubbles are buoyant, so they try to rise up and escape from the place where they were generated. 95% or more of the flow in the hull boundary layer is turbulent. Turbulence in a boundary layer starts small near the bow of the boat and dramatically increases/separates close to the stern. This significantly disturbs intended behavior of the bubble flows. As a result, a significant portion of generated bubbles will not stay in the boundary layer. Microbubbles will grow (merge together) and will also move outside of the boundary layer. They will try to rise up due to buoyancy or will be swept away by the turbulence. Any successful air lubrication system needs to slow down this process or deal with this in some way. For example, some systems require flat or concave hull bottoms or longitudinal channels to trap air bubbles, preventing them from escaping or moving around.

Because of freestream disturbances and boundary layer turbulence, need for more lubrication/bubbles in one region of the hull may be quite different from another region. For example, if the local low-pressure disturbances swept all of the bubbles on the port side of the hull—for the best performance, air lubrication system has to be adjusted to compensate for it.

All these problems are amplified when executing maneuverers, especially at high speed. When speedboat is going through a high-speed turn, its air lubrication needs on hull side inside the turn is quite different than that on the outer side. Generation of air bubbles must be controlled and adjusted by BDR. Failure to do so may end up in over-aerating the areas that should not be aerated. Putting bubbles on the hull areas critical for the boat stability may result in a spin-off or a barrel roll. Aerating the propeller may result in a loss of thrust.

Another drawback with existing BDR systems is that creation of a stable air bubble curtains works well for the specific shapes of the hull only. MALS and other similar systems work best for the flat bottom and concave bottom hulls. Unfortunately, these hull shapes are hydrodynamically inferior to V-shaped and round shaped hulls (which is the majority of the current sea going ships and boats). Use of BDR for V-shaped or round shaped hulls requires much more air/injectors (over-aeration) in comparison with flat bottoms. There is a lack of control of where bubbles go after injection in the water. When going in a straight line, there is a lesser problem. However, blowing of bubbles from the nozzles under a smooth hull may have undesired side effects when executing maneuvers (aerating parts of the hull that is critical for the stability or aerating a prop).

Most of the existing air lubrication systems that use bubbles will continue to blow the air through particular air nozzle(s), regardless whether it is really needed in the particular spot on the hull or not.

Most of air lubricated hulls used for the smaller boats are either variants of the stepped hull or hydrofoils design. Both have issues with stability when performing high speed turns, so they require different turning techniques and are much less safe than "traditional" V-hulls in that respect.

The present invention provides a system for using air bubbles that is more universal and can be used for the wide range of marine vehicles, hull types and operating conditions (various speeds and maneuvers). The presently disclosed system works for both large displacement hulls ships and a personal marine vehicle (speedboat) and can be retrofitted to the existing hulls.

SUMMERY OF THE INVENTION

The present invention utilizes a venturi effect to enhance bubble drag reduction system (BDR). It comprises of a Venturi Surface Structures (VSS) or a diverging channel that is placed around or over an air orifice on the surface of the hull. A VSS is designed to provide a venturi effect over an air generator outlet. The water flow through a VSS results in an increase in flow velocity in the narrow region of the venturi, and thereby forming a negative pressure that sucks air through the air orifice, injecting air bubbles into the water stream. The VSS causes that the air bubbles remain close to the hull, providing an effective air lubrication on the hull. Plurality of VSS systems are installed at various locations on the hull. The number of the VSS and their location depends on the required level of drag reduction for a particular marine vehicle. These structures and air outlets turn portions of the hull into venturi air injectors. In addition, this structure creates larger boundary layer turbulent components passing through the channels and thereby improves the skin friction drag. A VSS also serve as a vortex generator, delaying local stream separation.

The venturi surface structures VSS can be an open channel or closed channel. In the closed channel type, the top portion of the structure is closed and the water flows inside a closed channel. For example, such a closed top venturi surface structure can be created by cutting a traditional round Venturi pipe (or any pipe with a wide opening and a narrow exit) in half lengthwise and placing it over the air orifice on the hull surface. In this case, the air orifice is covered by the narrow outlet of the channel or tube.

The venturi surface structure VSS with open channel is formed by two thin plates having a longitudinal orientation with an angle to each other forming a converging channel attached onto the hull surface having a wider portion (inlet) and a narrower portion (outlet). The wider portion faces the incoming water stream and the narrower outlet is right around an air orifice. This creates a Venturi Surface Structure (VSS) on each air orifice. The wider inlet is towards the bow and narrow outlet further aft. So, the venturi air injector is formed right on the surface of the hull.

The closed VSS channels are far superior in performance, but due to their tubular structure, they are susceptible to biofouling, which causes problems in drag reductions. Therefore, closed VSS channels are not efficient for big marine vehicles that usually sit in the water for prolonged periods of time. But due to their high performance they are great for the vehicles that are out of the water most of the time, such as canoes, small personal pleasure crafts, etc.

The stream of water, generated by a marine vehicle motion, enters the channels and creates a low pressure zone that pulls the air into the stream of water through the air orifice. Air bubbles formed in the stream of water then flow close to the hull surface. An array of channels is installed on the hull, creating stream of the bubbles. This arrangement of the channels on the hull surface increases the water stream velocity, increases flow turbulence, controls the air bubble curtain and keeps the bubbles close to the hull surface by reducing the bubble dispersion.

Dimension of the channels may vary and should be comparable to the thickness of the local boundary layer of the hull and should be tailored to the range of operating speeds and conditions. In addition, a VSS should create a low-pressure area that is sufficient to draw air bubbles without creating a vaporous cavitation in the water.

In another embodiment, the channels or tubes of the VSS are installed on a skin. The skin is a thin profile sheet of plastic or any other water-resistant material with a thickness. The skin has a plurality of concealed air ducts extended crosswise in longitudinal of the skin and have an outer layer. The skin is detachably fixed on the hull surface, extending above a waterline of the hull surface to draw the air into the air ducts. Each air duct further extends to the non-wetted area above water line. The skin has one or more air-intake zones, which are preferably located in nonwetted zones of the skin. The air orifices are made on the outer layer of the skin and along each air duct. Once the marine vehicle is put in motion, the water flow generates a low pressure region at the air orifice outlet, drawing air into the air ducts and from the air-intake zones, forming bubbles.

In another embodiment, the two plates of VSS channel for intake water flow management are offset and go over each other with an particular angle. This VSS forms a truncated cone shape channel having a narrower outlet and a wider inlet. This VSS reduces the water up-flow and over-flow creating larger turbulent component passing through the channel, and cause injection of more bubbles, thereby improve skin friction drag.

In another embodiment the VSS structure is a flume shape channel with closed side walls creating a narrower outlet and a wider inlet with an air orifice on the narrower outlet.

In another embodiment, a variable geometry in VSS is disclosed to support a wider range of operating conditions. The variable geometry VSS can retract or fold if it is not in use.

Air outlets can be regular "small bubble" generating nozzle, which are essentially small air outlets on the hull or the skin that are connected to a pathway to the air source. The air outlets diameters should be such that the negative pressure generated by the water flow can generate enough suction to generate bubbles into the water stream.

The present invention creates a self-regulating system by injecting more air/bubbles in places where water stream in boundary layer speed is the greatest with relation to the hull and less bubbles when local stream is more stationary. The present invention improves the stability of the bubble curtains by injecting more air bubbles into places where bubbles will be most likely swept away by a turbulence (higher speed turbulent components of the stream). This creates a self-adjusting and self-priming system. This can further reduce boundary layer turbulence and improve stability of air bubble carpet. VSS uses less air than stepped hulls and allows more precise control over the wetted areas, reducing drag over the wider range of operating conditions.

The self-adjusting effect of the present invention provides a simple and cost effective system by increasing or decreasing air flow proportionate to the pressure drop in each VSS, specifically in fast-moving shallow draft vehicles (speedboats, jet ski, etc.) with few or no moving parts that doesn't require compressors, cut outs in the hull, etc. This system can be built-into new hulls or retrofitted to wide variety of existing marine vehicles.

In the present invention the stream of water and air bubbles mixture exiting each VSS is highly directional and much more predictable in behavior than simple blow of bubbles or micro-bubbles over a smooth hull. It also provides a much more predictable behavior of the bubble stream when vehicle is turning or executing any other maneuvers. In the prior art system, bubbles or micro-bubbles lose their lubrication properties and move out of boundary layer in some distance from the bubble injector.

Hull designers and naval architects can use VSS to achieve better control of the vehicle by aerating only the areas of the hull that need air lubrication for better efficiency. This is extremely important for high speed, maneuverable marine vehicles.

Therefore, the present invention provides the following advantages over the prior art BDR systems:
  Improves the existing Bubble Drag Reduction (BDR) systems by placing a Venturi Surface Structures (VSS) over air orifices on the surface of the hull;
  Creates a simple, no moving parts BDR system that uses only venturi surface effect to generate bubbles, with no need for compressors, complicated control systems, or cut outs in the hull;
  Allows for higher speeds, better handling and fuel economy of the vehicle;
  Improves the stability of the bubble curtains;
  Creates a self-adjusting and self-priming bubble injection system by injecting more air bubbles into places where bubbles will be most likely swept away by turbulence;
  Creates a more predictable and directional bubble curtain;

Reduces boundary layer turbulence;
Reduces the required BDR air pressure, and
Provides a system that can work in high speed maneuvers and turns.

BRIEF DESCRIPTION OF THE DRAWINGS

Embodiments herein will hereinafter be described in conjunction with the appended drawings provided to illustrate and not to limit the scope of the claims, wherein like designations denote like elements, and in which.

DETAILED DESCRIPTION OF PREFERRED EMBODIMENTS

Figure 1A:
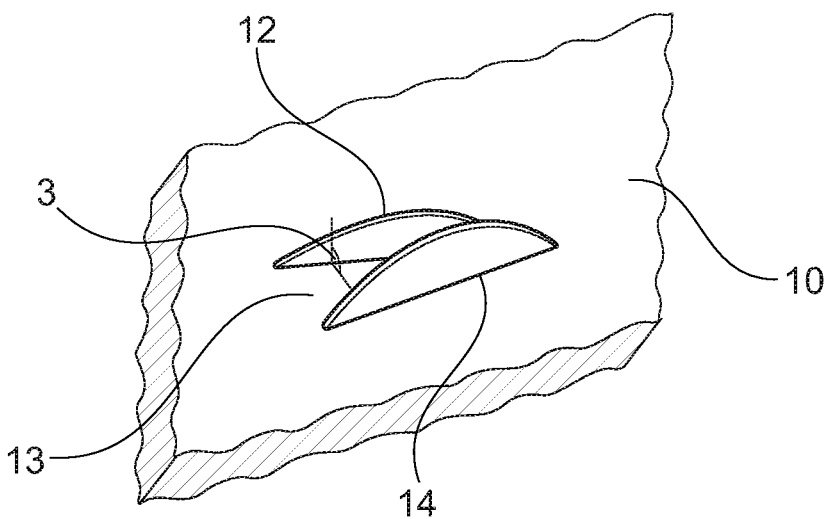
FIG. 1A shows a perspective view of the open Venturi Surface Structure (VSS) having two plates at an angle to each other.
Figure 1B:
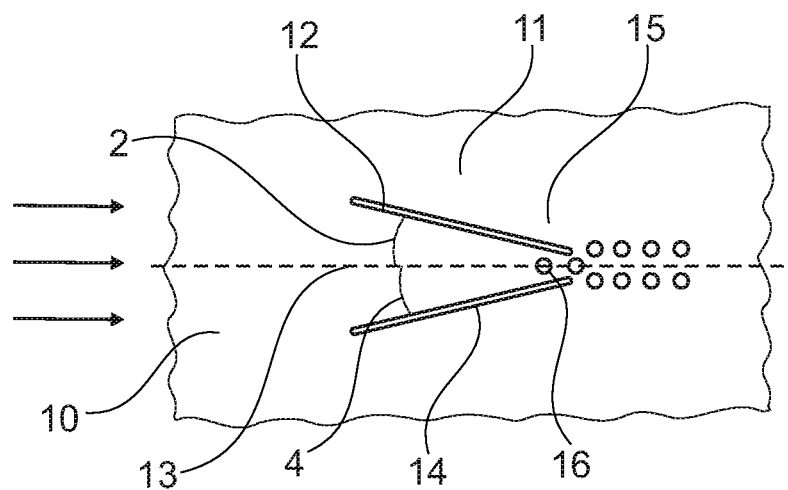
FIG. 1B shows a top view of the open VSS channel according to FIG. 1A.
Figure 1C:
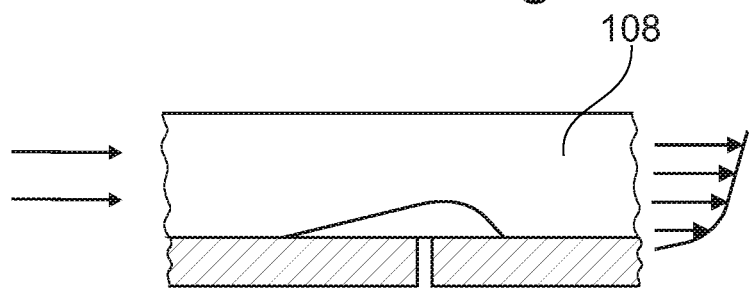
FIG. 1C shows a side view of the open VSS channel according to FIG. 1A.
Figure 1D:
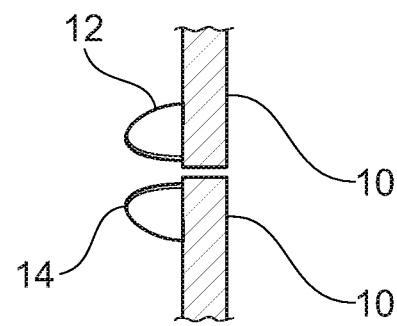
FIG. 1D shows a rare view of the open VSS channel according to FIG. 1A.

FIGS. 1A to 2B show perspective and plane views of one embodiment of an illustration of an open Venturi surface structure VSS 11 of the present invention to create a venturi effect over an air orifice on the hull surface or on a skin attached to the hull. The VSS 11 is a converging channel comprises of two walls 12, 14 having a longitudinal orientation with an angle with respect to each other forming a truncated cone shape channel having a wider inlet 13 and a narrower outlet 15. The wider portion 13 facing an incoming water stream and the narrower outlet 15 is over an air orifice 16. Each VSS 11 is installed over an air orifice to create air bubbles. The hull of a marine vehicle comprises a set of air ducts which are manufactured or retrofitted based on the shape and the usage by the manufacturers. The air orifices open to the air ducts of the hull. The air orifices are either manufactured on the hull surface 10 or are part of a skin that is attached to the hull surface 10.

The first wall 12 is attached to the hull surface 10 forming a first longitudinal angle 2 with respect to the flow direction passing through the orifice 16, and the second wall 14 is attached to the hull surface 10 forming a second longitudinal angle 4 with respect to the flow direction passing through the orifice 16. The longitudinal angles 2 and 4 can be vary between 10 to 40 degrees to avoid generation of low pressure and highly turbulent zone on the outer side of the VSS.

The first wall 12 extends outwardly at a first extensional angle 3 with respect to the hull surface 10, and the second wall 14 extends outwardly at a second extensional angle (not shown) with respect to the hull surface 10. The first and the second extensional angles each are at 90 degrees. However, the angles each can be vary between 30-90 degrees.

According to Arrows the direction of the water stream is shown (left to right) and oppose to the direction of the marine vehicle 100 (right to left). A stream of water, generated by a marine vehicle motion 100, enters the channel 11 from wider inlet 13 and creates a low pressure zone that pulls the air into the stream of water. The air stream immediately breaks into bubbles inside the water stream.

Figure 2A:
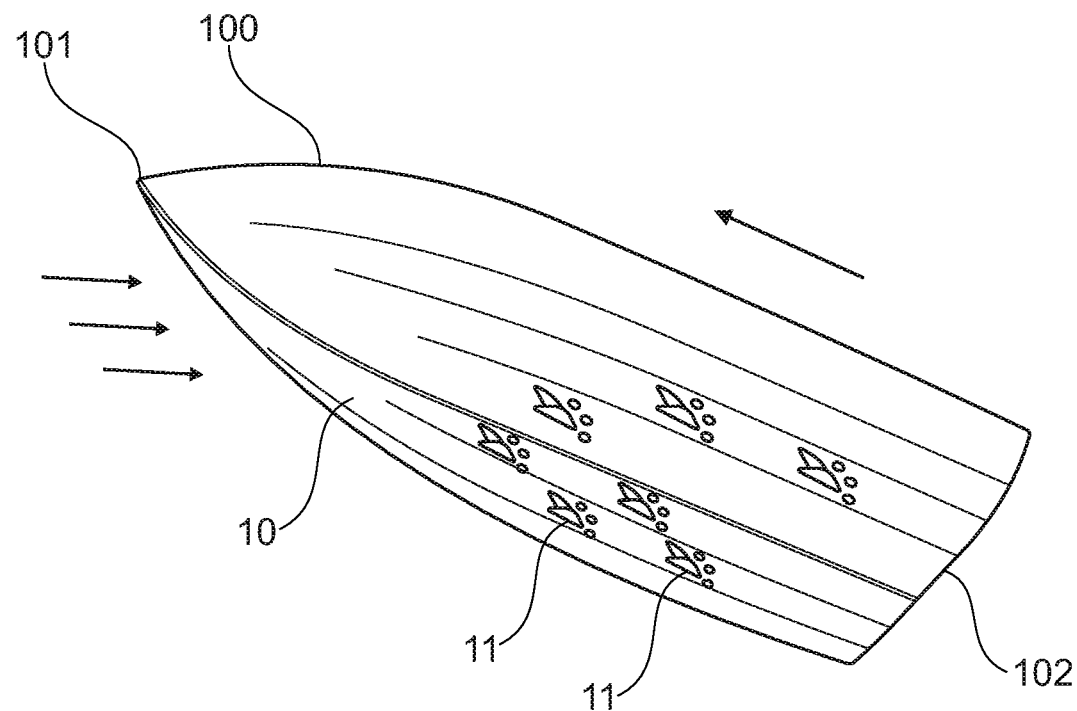
FIG. 2A shows an array of the open VSS channels on the hull surface of a marine vehicle.
Figure 2B:
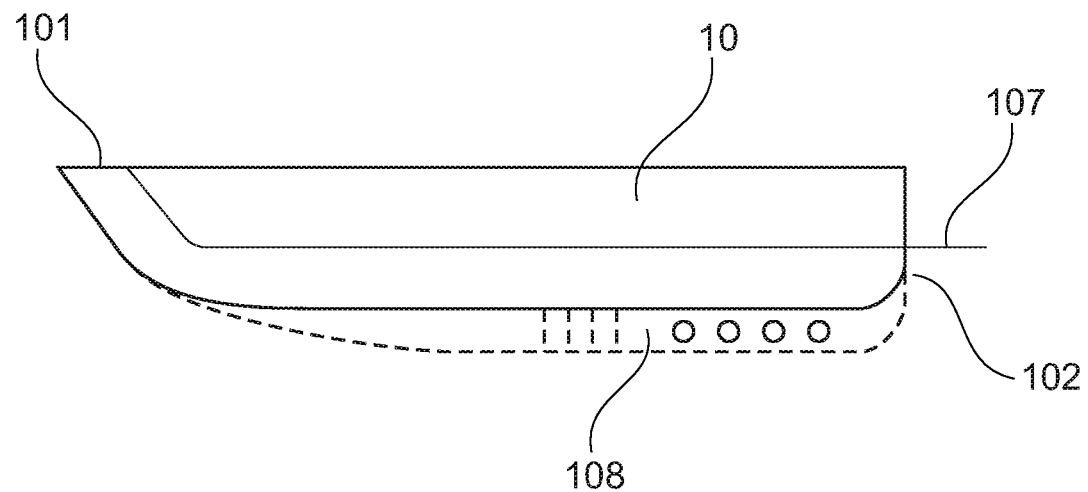
FIG. 2B shows the turbulent created in boundary layer of the marine vehicle.

FIGS. 2A and 2B show an array of the VSS channels on the hull surface 10 of a marine vehicle 100. An array of VSSs 11 are placed on the hull surface 10 and in the direction of the water stream. The array of VSSs 11 create an air bubble curtain on the hull 10 and prevent air bubbles to be swept away from the hull surface 10.

Air orifice 16 can be equipped with regular "small bubble" generating nozzle—essentially a pathway to air source with one or several small nozzles—or with a microbubble nozzle or generator. This air/bubbles nozzle could inject bubbles at 90 degrees to the hull surface or could be angled towards the stern 102. This prevents dynamic water pressure against exiting bubbles. Microbubbles generators require few extra steps to make microbubbles and deliver them as a mixture bubbles and water. It will work for VSS 11 as long as this mixture can be sucked in by the low-pressure area of VSS 11.

As depicted in FIG. 2B, each VSS 11 operates in the boundary layer of the hull 10. A boundary layer 108 is the layer of fluid in the immediate vicinity of a bounding surface where the effects of viscosity are significant. The boundary layer 108 starts very thin at the bow of the marine vehicle 101 and increases as moving towards stern 102. It will also become increasingly turbulent as moving away from the bow 101 and closer to the stern 102.

Size of the boundary layer at the stern 102 will depend on the speed, length of the waterline 107 and viscosity of the water and few other factors. It may start as a few millimetres at the bow area 101. At the stern 102 it will be few centimetres for a small marine vehicle 100 and it will be in the range of meter(s) for large vehicles. Boundary layer 108 thickness will decrease when the speed increases.

The relative speed of the water stream in relation to the hull 10 is zero on the surface of the hull, unless hull has super hydrophobic coating, and will rapidly increase as moving away from the hull 10. In order to utilize a venturi effect, the VSS 11 height has to be somewhat comparable to the thickness of the boundary layer 108. Boundary layer 108 does not have a real border. Thickness of the boundary layer 108 is usually defined by the imaginary line drawn where relative water speed passing near the hull 10 is 99% of the "free flowing" water stream which is speed of the marine vehicle 100, if there is no current. The VSS channels 11 can extend above the imaginary line or be under the line. The VSS channels 11 can work on each marine vehicle as long as the VSS channels 11 are installed in the wetted part of the hull under the water line 107 with enough relative speed to produce a desired venturi effect.

Size and geometry of the VSS channels 11 should depend on its placement on the hull 10. A VSS 11 that is located at the front of the marine vehicle towards the bow 101 has a smaller height, while a VSS located close to the stern 102 is much taller. The maximum height of each VSS is further configured to be comparable with the thickness of the boundary layer 108 at the area of placement of the VSS.

Figure 3A:
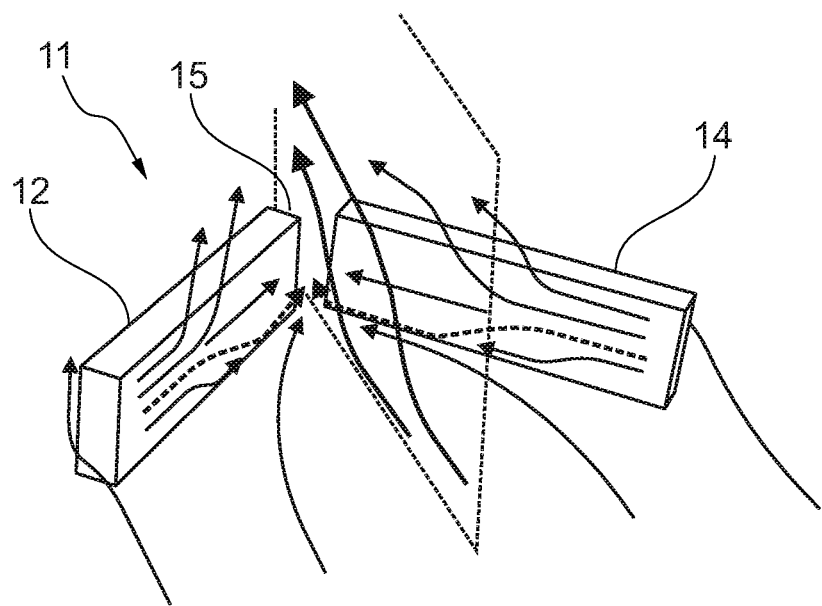
FIG. 3A shows the field in an unadjusted 2 plates of VSS channel.
Figure 3B:
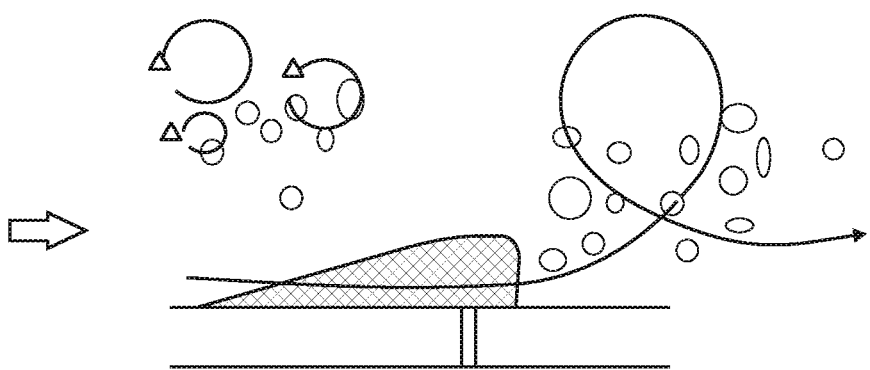
FIG. 3B shows the flow characteristics and turbulent components in a boundary layer.
Figure 4A:
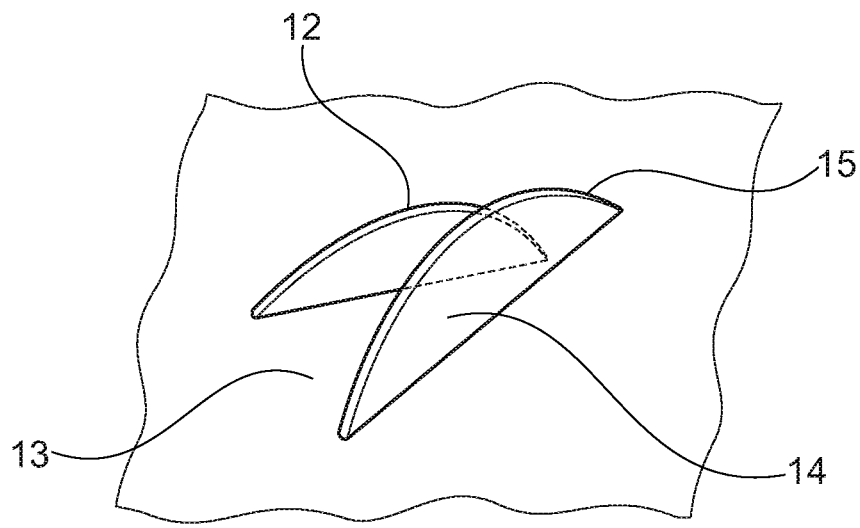
FIG. 4A shows a perspective view of another embodiment of a VSS channel that has a better control of up-flow and reduction of flow over.
Figure 4B:
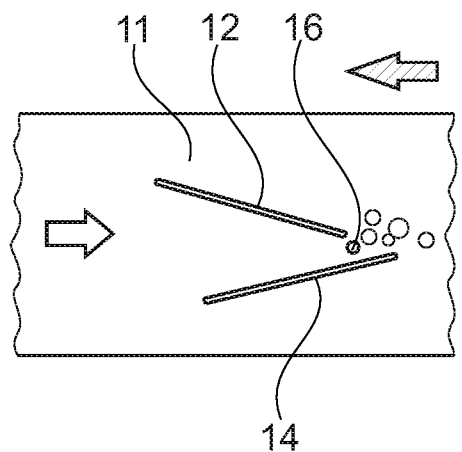
FIG. 4B shows a top view of the VSS channel according to FIG. 4A.
Figure 4C:
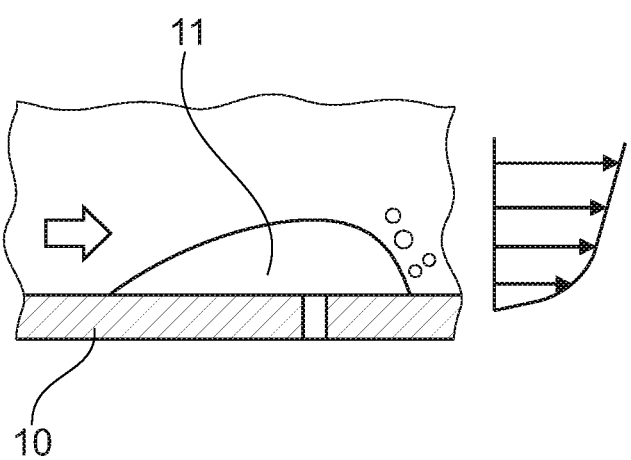
FIG. 4C shows a side view of the VSS channel according to FIG. 4A.
Figure 4D:
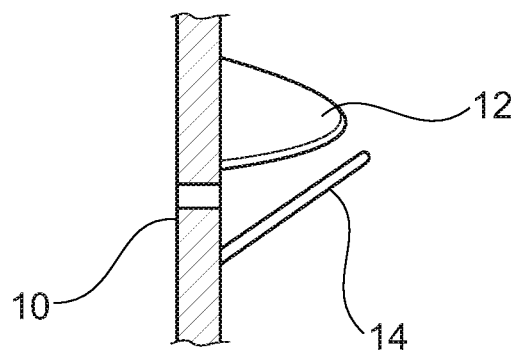
FIG. 4D shows a rare view of the VSS channel according to FIG. 4A.

As shown in FIGS. 3A and 3B, the VSS channels 11 have a strong "up flow" and "overflow" around the narrow outlet 15. Also, ability to flow over the VSS 11 will be much greater for the upper layers of the stream than passing through the VSS structure 11. The hull boundary layer flow in regions with high speed can greatly diminish venturi effect generated by VSS 11. The up-flow and flow overs of the VSS 11 can be controlled by various modifications on the structure of the channel based on their applications such as increasing of the height of the channel wall from the wider inlet 13 to the narrower outlet 15 and or adjusting the channel wall angles towards each other. In addition, the VSS 11 is designed to increase the water flow and create a larger turbulent component passing through the channel 11 to improve skin friction drag.

Walls 12 and 14 should have shallow angle towards the incoming stream to avoid generation of a low pressure highly turbulent zone on the outer side of the walls 12 and 14 and extend into boundary layer portion with enough relative stream speed to concentrate and promote the flow over the air orifice 16. The walls 12 and 14 are required to provide directional flow for BDR and therefore, channel flow over the air orifice 16. Walls 12 and 14 further allow for the protrusion for the air orifice 16 to be smaller as they promote flow over it. Walls 12 and 14 have a small cross-section towards the flow and should not generate considerable drag and act as vortex generators and directional structures for BDR air bubbles, controlling boundary layer turbulence. They act as a shield for air orifice 16 forming a cross-flow when a speed boat slides side-ways for example, or when cross current or turbulence is happening.

FIGS. 4A to 4D shows another embodiment of the open VSS channel 11 which is constructed by offsetting one wall 12 over the other 14 forming a narrower inlet area 15 where the walls touch. In preferred embodiment one wall is shorter than other wall to better control an up-flow of the stream and reduce an over-flow. These shapes have smooth hydrodynamic designs without sharp turns/edges.

Figures 5A, 5B, 5C:
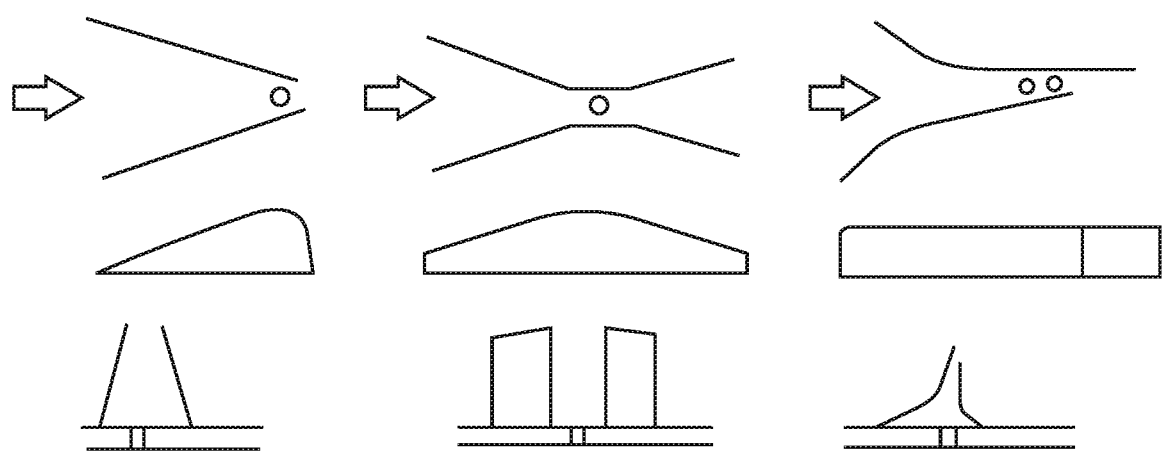
FIG. 5A shows another design of the VSS channel.
FIG. 5B shows another design of the VSS channel.
FIG. 5C shows another design of the VSS channel.
Figure 6A:
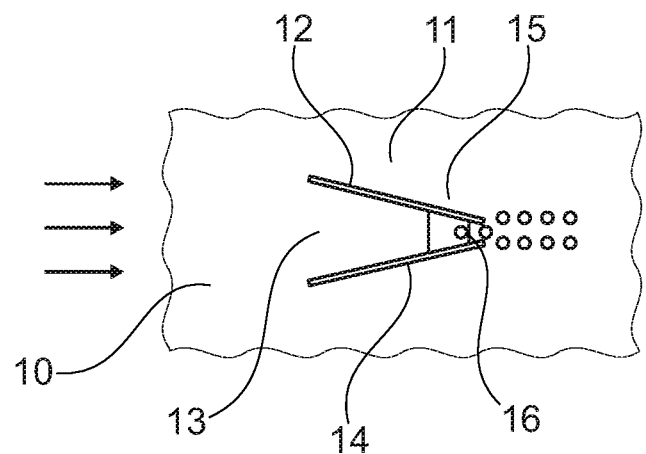
FIG. 6A shows another embodiment of open VSS channel with protruded air orifice.
Figure 6B:
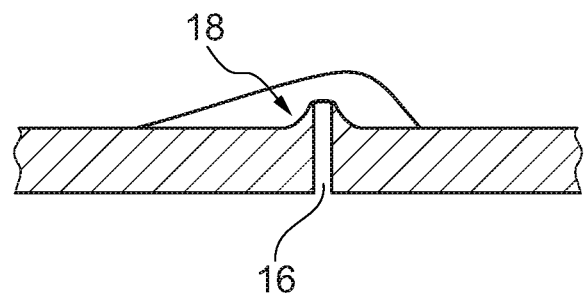
FIG. 6B is a side view of the open VSS channel with protruded air orifice according to FIG. 6A.
Figure 6C:
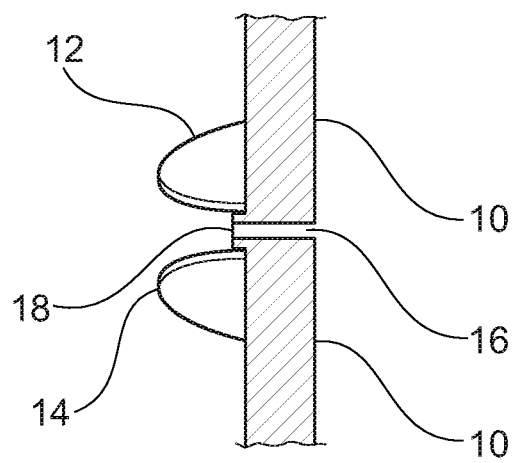
FIG. 6C is a rare view of the open VSS channel with protruded air orifice according to FIGS. 6A and 6B.
Figure 7A:
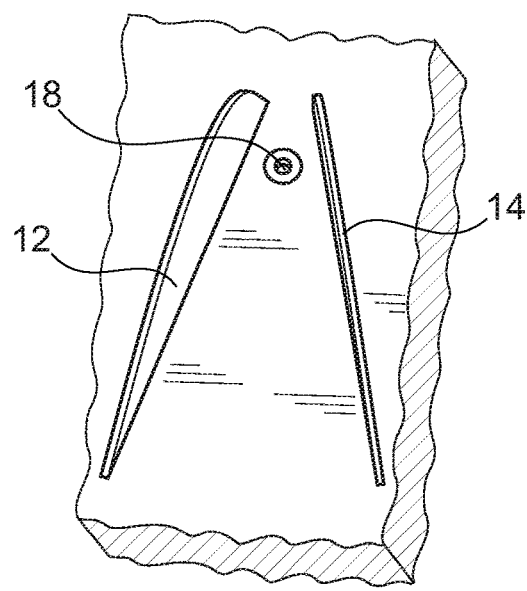
FIG. 7A is a perspective view of the open VSS channel with protruded air orifice.
Figure 7B:
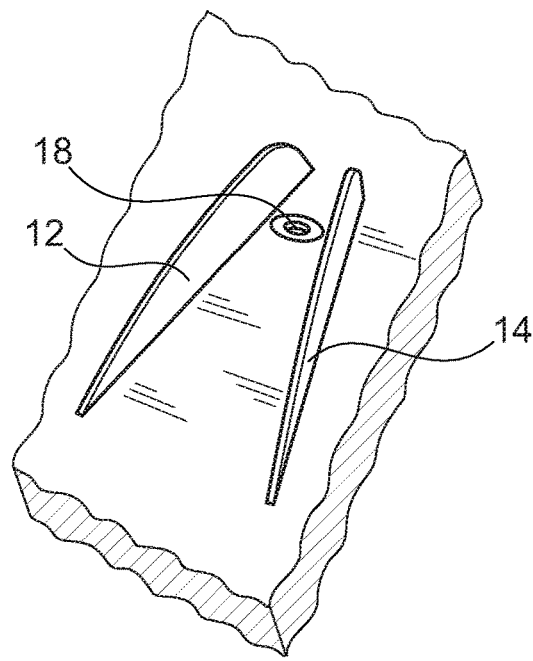
FIG. 7B is a perspective view of the open VSS channel with another shape of protruded air orifice.
Figure 7C:
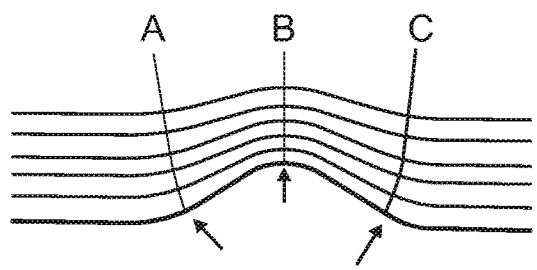
FIG. 7C shows the generation of stream flows over the protruded area to generate an area of low pressure directly over the top of the bump.
Figure 7D:
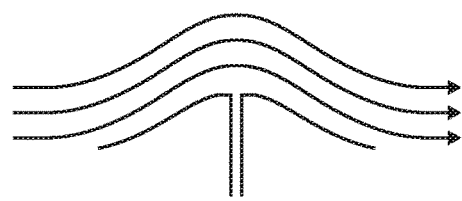
FIG. 7D shows the overflow of the stream over the bump.

FIG. 5A to 5C show various shapes of the open VSS channel 11 which can be used based on their application. Each VSS 11 is characterized based on its design and its geometrical parameters, including length, wider inlet 13 facing an incoming stream and narrow outlet 15 and their ratios to define pressure drop for the specified range of speeds. Hull designers should select correct venturi geometry, so that it produces desired low-pressure area and air bubbles injection effect. The height and length of the walls can be the same or different. The walls can further be arranged with the same or different longitudinal and extensional angles in respect to each other and the hull surface.

In one configuration the shape of the first and the second wall are fin shape with a slowly increasing front height and a fast reducing back height. These shapes have smooth hydrodynamic designs without sharp edges. In another configuration the VSS may be a Flume shape with a converging diverging structure to accommodate for air lubrication for both in a forward moving and a backward moving marine vehicle. In another configuration the walls of the VSS are not asymmetric. The length of one of the walls is shorter than the length of the other wall to accommodate for highly non uniform flow regions that occur close to the edges of the hull. The shorter wall may angle towards the longer wall and create a narrow throat. A combination of different shapes of VSS can be applied on various parts of a hull surface.

In another embodiment the air orifice is made at the tip of a protrusion from the hull surface creating a smooth bump to generate an area of low pressure over the bump, resulting a more efficient operation of the BDR. As shown in FIGS. 6A to 7D the air orifice 16 in the open VSS channel protrudes outwardly from the hull surface 10 and creates a bump 18 to better operate the BDR injector. Protrusion of the air orifice 16 should be hydrodynamically smooth and can have form of a smooth ridge running crosswise from one wall 12 to the other wall 14 or can be a smooth round shape. Job of the walls 12 and 14 are to channel and "bring down" a portion of the boundary layer stream with enough speed. When this stream flows over the bump 18, it generates an area of low pressure (B) directly over the top of the bump 18 between the high pressure areas (A and C). The bump 18 is hydrodynamically smooth shape causing water to flow over, rather than separate at the back of the bump 18.

Figure 8A:
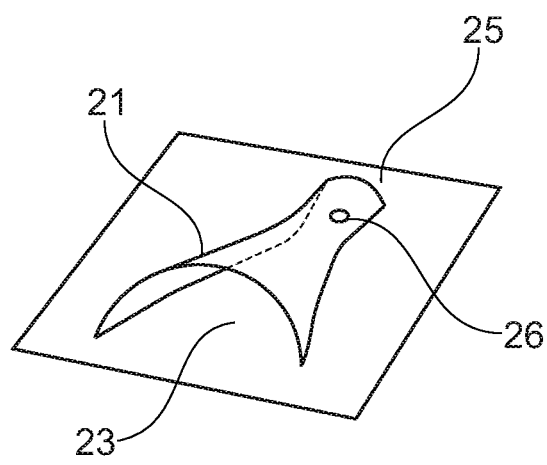
FIG. 8A is a perspective view of a closed VSS channel.

In another embodiment the VSS is a closed channel. As shown in FIG. 8A the VSS channel 21 can be created by cutting a traditional round Venturi pipe (or any pipe with a profile that has constricted area) in half lengthwise creating a closed VSS channel 21 and placing the half pipe over an air orifice 26 on the hull 10. So, the hole is covered by the narrow outlet 25 and the wider portion 23 facing an incoming water stream. This structure delivers much stronger air injection performance. Closed VSS channel 21 with venturi geometry mounted on the surface of the hull is a true venturi and is far superior in performance than open VSS channel 11, but it is less resistant to biofouling and requires more maintenance.

Figure 8B:
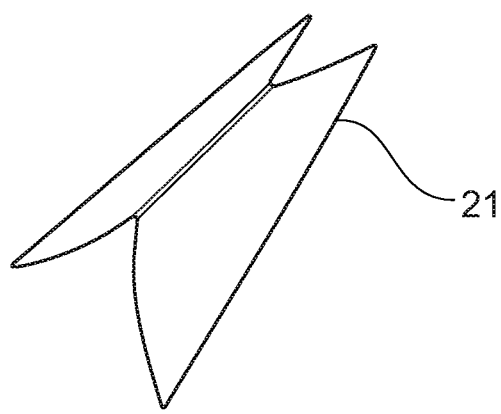
FIG. 8B is another embodiment of a closed VSS channel.
Figure 8C:
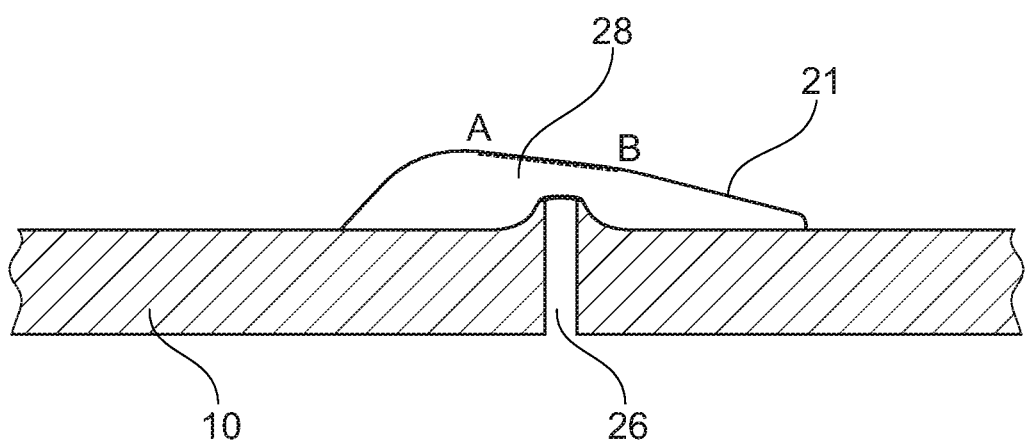
FIG. 8C is a side view of the closed VSS channel.

FIGS. 8B and 8C show another embodiment of the closed VSS channel 21 in which the walls are angled and jointed along the line AB to allow for the adjustable geometry. The air orifice 26 protrudes outwardly from the hull surface 10 and creates a bump 28 to better operate the BDR injector. Protrusion should be hydrodynamically smooth. The channel "bring down" a portion of the boundary layer stream with enough speed. When this stream flows over the bump 28, it generates an area of low pressure directly over the top of the bump 28. This low-pressure area will act as an auto bailer (bailing out any water that may have gotten inside the air ducts in the hull of the marine vehicle when boat is stationary).

When the water is out of the system it will start drawing air from the air orifice 26, promoting bubble generation/injection into the stream. If the air orifice 26 is pressurized, it will help for deep running marine vehicles, but it should work without (or with minimal) pressurization for personal watercrafts. This bump 28 should be hydrodynamically smooth shape to cause water to flow over, rather than separate at the back of the bump 28.

Figure 9:
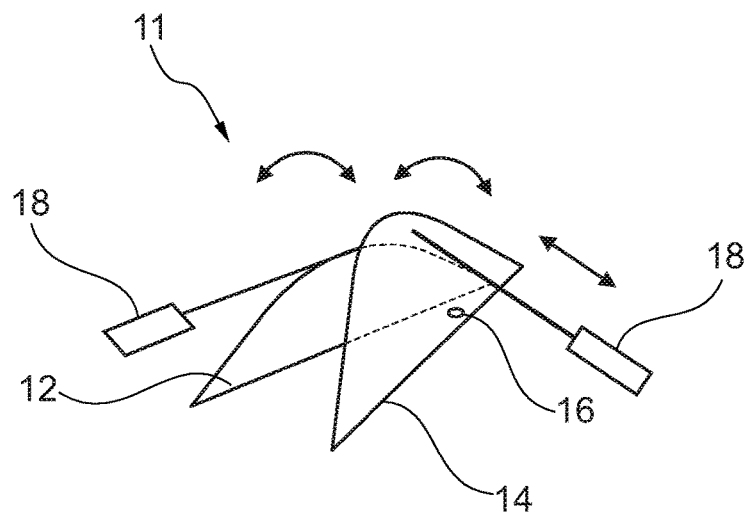
FIG. 9 shows an adjustable and foldable geometry VSS channel.

FIG. 9 shows another embodiment of the open VSS channel 11. In some marine vehicles 100, BDR system may not be always on. VSS channels 11 will create local low-pressure areas, increasing drag. This should be relatively small in comparison with the existing drag of the entire hull 10. In this case, a foldable or retractable VSS may be used, which is depicted in FIG. 9. The VSS channels 11 may have actuators 18 on each wall 12 and 14 to fold each channel wall, so they lay flat on the hull surface when VSS is not is use. Either linear or rotating actuators can be used. Sometimes one configuration of VSS 11 is not sufficient. For example, some VSS channels 11 may perform well under one set of the target operating speeds but will produce a vaporous cavitation for the other speed. Or there is a need to have a constant effect throughout the much wider range of speeds. In this case, a linear actuator 18 is installed on one of the walls 12 or 14 of the VSS channel to adjust the angle of the walls with respect to each other to move one of the angled walls back and forth to alter venturi geometry and to change the performance of the channels for various speed preferences.

A control system operated by a remote control or wiring control system is provided to control the actuators 18 and adjust the VSS 11 configuration for various speeds and conditions. For example, to have two sets of VSS 11: one targeting low speeds and one set for the cruising speed range. One set can be deployed and the other set retracted.

Figure 10:
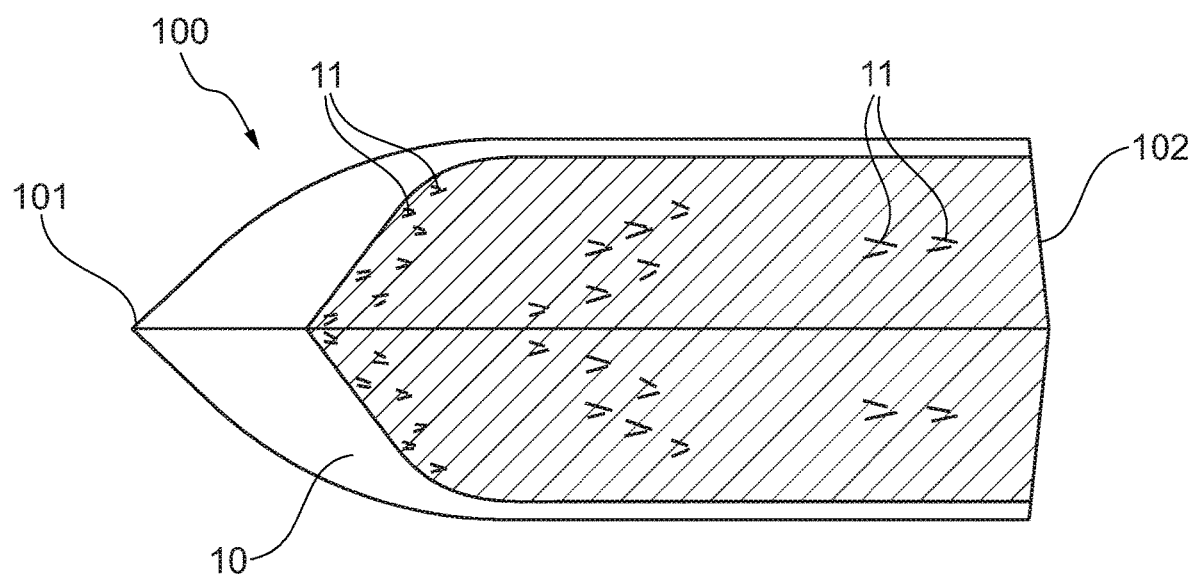
FIG. 10 shows the bottom view of an array of VSS on the hull of a marine vehicle.

FIG. 10 shows a bottom view of a hull 10 showing a variant for the VSS 11 placement. Bubble will lose their lubricated properties some distance from the VSS 11. Therefore, each VSS 11 is strategically positioned in the downstream of another VSS 11 in the direction of the bubble stream before bubbles move out of boundary layer, unless it is intended to create a disjoint aerated area.

With the present VSS 11, there is no need to dictate any hull shape or exact VSS placement and sizing. These decisions will be up to the naval architect and hull designer. However, some general guidelines for the placement can be outlined:

The VSS 11 that is located at the front of the marine vehicle towards the bow 101 has smaller height, while the VSS located close to the stern 102 is much taller. The maximum height of each VSS is further configured to be comparable with the thickness of the boundary layer 108 at the area of placement of the VSS. Symmetry over the centreline of the boat has to be maintained.

For small sailing boats, speed boats and personal watercrafts at operating speed of 2-15 knots, the maximum height of each VSS is between 1-10 cm from the bow to the middle area of the hull surface (mid-hull) and the maximum height of each VSS from middle area of the hull surface (mid-hull) to the stern is between 10-15 cm.

In large ships at operating speed of 15-25 knots, the maximum height of each VSS is between 1 cm-1 m from the bow to the middle area of the hull surface (mid-hull), and between 1 m-3 m from the middle area of the hull surface (mid-hull) to the stern.

It is generally not required to place VSS very close to the stern 102 as it will have all the air bubbles generated fore of the boat floating by when moving forward. Also, boundary layer thickness will decrease with the speed increase.

With various placement shape of the VSS channels 11, the marine vehicle 100 can function various modes. For example, marine vehicle 100 with planing hulls are designed to rise up and glide on top of the water when enough power is supplied. These vehicles may operate like displacement hulls when at rest or at slow speeds but climb towards the surface of the water as they move faster.

Figure 11A:
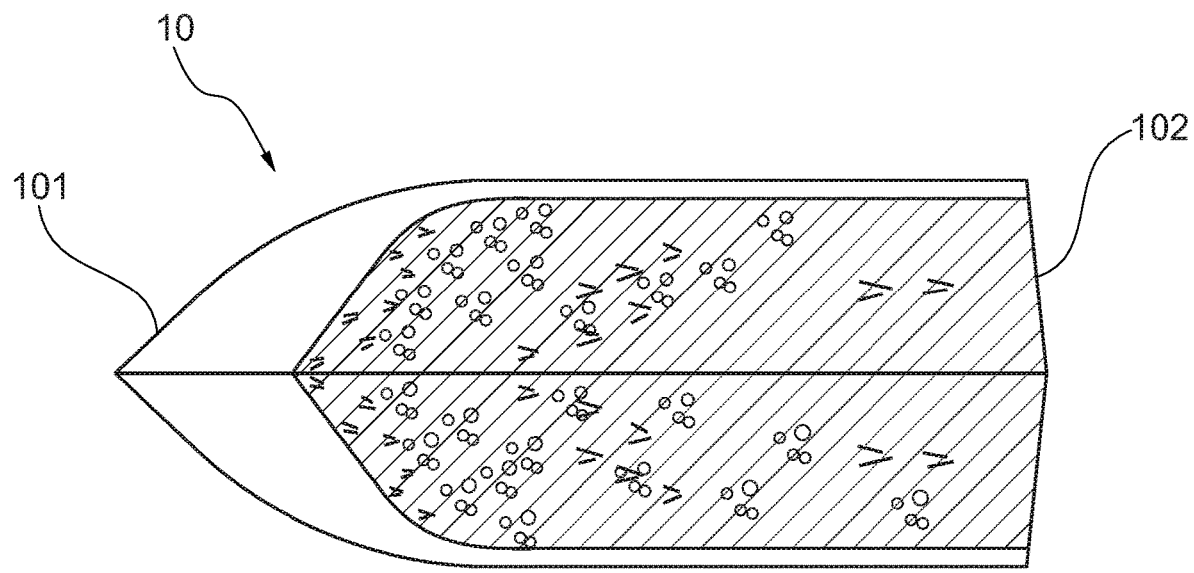
FIG. 11A shows an array of VSS for displacement mode.
Figure 11B:
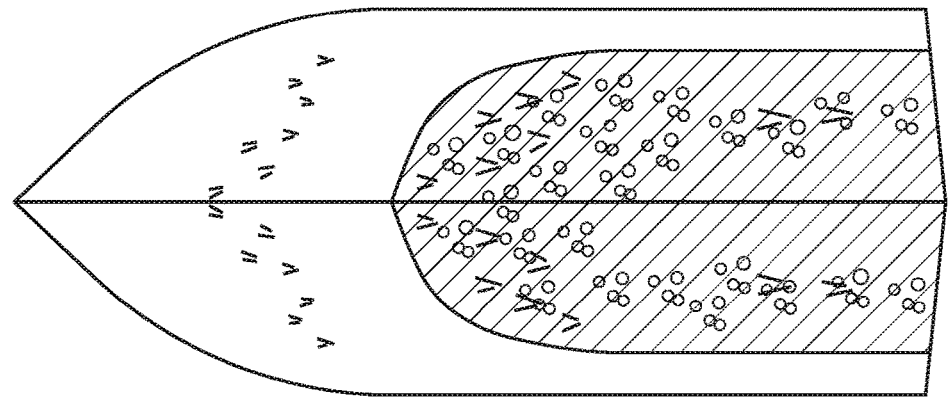
FIG. 11B shows an array of VSS for a planing mode.

Various placement of the VSS channels 11 can enable the marine vehicle 100 in two different modes: Displacement mode VSS and Planing mode VSS. FIG. 11A shows the VSS channel arrangement in displacement mode. Displacement mode VSS arrangement are located near the leading edge of the displacement wetted area and should work the best at lower speed ranges. The main responsibility of these VSS is to assist with getting on the plane (transitioning to the planing mode) faster. FIG. 11B shows the VSS set up in planing mode. Planing VSS are located near the leading edge of the wetted area when planing. They should be configured for the range of planing speeds. When boat is planing, displacement VSS are out of the water, so it is possible to have two distinctly different wetted/air lubricated configurations for displacement and planing modes.

The VSS 11 may comprise a self-regulating control system. Sometimes difference in venturi effect pressure is not enough to produce a desirable bubble generating effect. VSS 11 can have a control system that uses pressure sensors in each VSS and key easily amplify self-regulating VSS effect by pumping more air to VSS that has low pressure and restrict air to VSS that has higher pressure. Reverse of this will dampen VSS effect, which could be useful for some situations as well (like some maneuverers).

Figure 12:
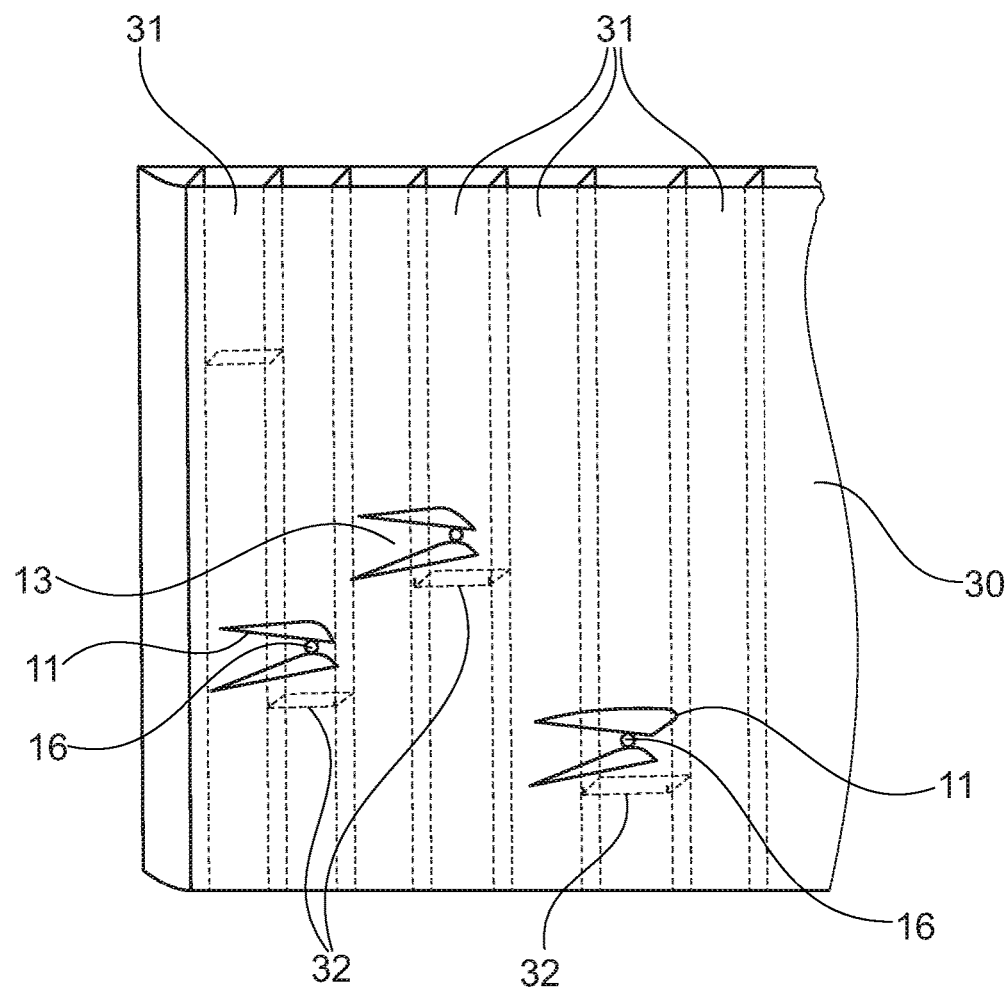
FIG. 12 shows a skin for installing VSS channels on the hull surface.
Figure 13:
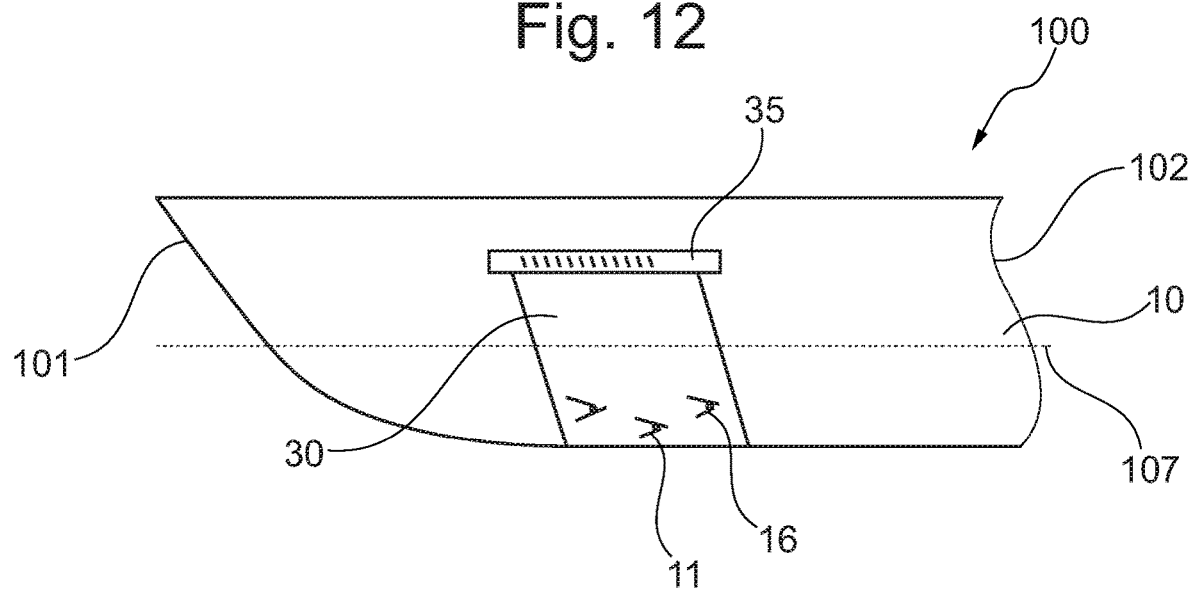
FIG. 13 shows a Skin application on a hull surface of a marine vehicle.

In another embodiment according to FIGS. 12 and 13 VSS 11 comprises of a simple skin 30 which is a thin sheet of plastic or any other suitable material which has a thickness with concealed air ducts 31 extended crosswise in longitudinal of the skin 30 and have an outer layer. The skin 30 can be detachably fixed on the hull surface 10 or can be a part of the hull extending above the waterline of the hull surface 10 to draw the air into the air ducts 31; each air duct 31 further extends to the non-wetted area above the water line. The skin has an air-intake 32 for each air duct 31 to draw the air into the air ducts. A plurality of air orifice 16 is formed on the outer layer of the skin and the VSS channels 11 are attached on the air orifices. The stream of water, generated by the marine vehicle motion, enters the channels and creates a depression that draws air from the air ducts 31 into the channels 11. The air bubbles are formed in the stream of water, and the air bubbles are carried in the stream of water and exit through the air orifice 16 as a plurality of microbubbles.

The skin 30 can be detachably fixed to the specific wetted areas of the hull, extending above waterline 107, so VSS channels 11 can draw the air. When the marine vehicle 100 is stationary, water may enter air ducts 31 and flood them. Air ducts 31 that are extended to the non-wetted areas (above water line) can have an optional air intake cover 35 to minimize amount of water that can enter in an air duct 31. Air intake cover 35 acts as a usual air intake diffuser and can also control air distribution to the individual ducts 31 within the skin 30. For instance, operator can "close" air supply to some region of the ducts 31 or open it to increase amount of bubbles generated. This can achieve more stable ride. When vehicle 100 starts to move—venturi effect will draw water out of the ducts 31 and start drawing air. If flooding of the ducts 31 is undesirable each duct 31 can have a check valve right above the air intake 32. This check valve could be in a simplest design being a small floating plastic ball under the round opening, but it will add moving part and will increase the cost of manufacturing.

The skin 30 is in various dimension based on the shape and structure of the marine vehicle 100 and extend to a non-wetted area above the waterline 107 of the marine vehicle. The air ducts 31 can have any configuration such as a rectangular, circular or oval shape.VSS channels 11 can be formed as ridges made out of the same material or could be made from a different/composite material glued on top of the skin 30 with air ducts 31. Air ducts 31 can have any configuration as long as they deliver air to various channels 11 located on the skin 30.

Figure 14A:
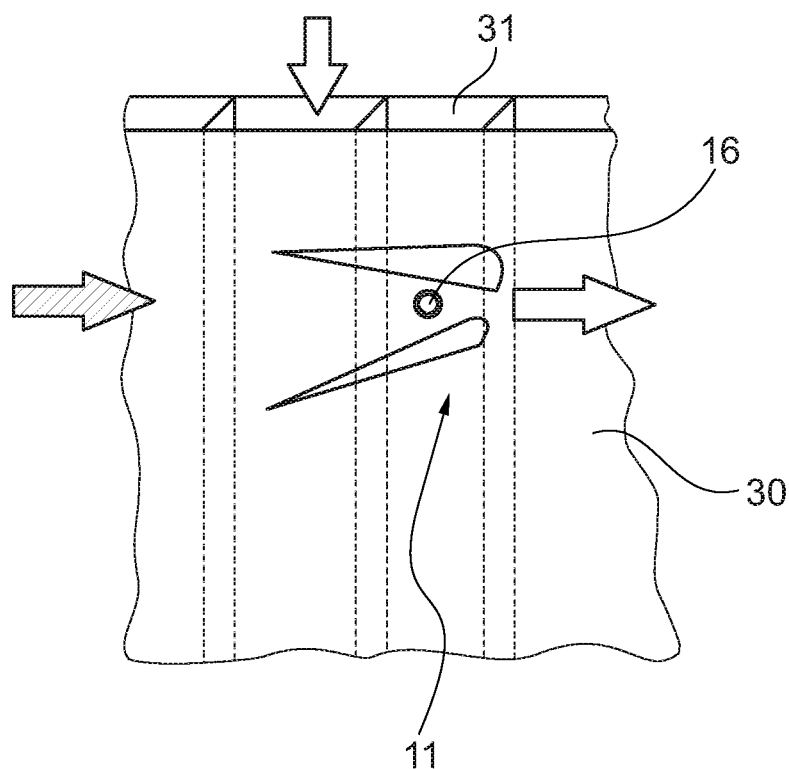
FIG. 14A is a top view of Skin integrated Tesla valve (air outlet)
Figure 14B:
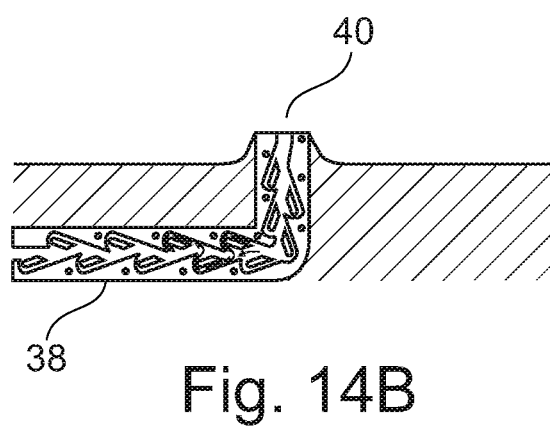
FIG. 14B is a side view of Skin integrated Tesla valve (air outlet)
Figure 14C:
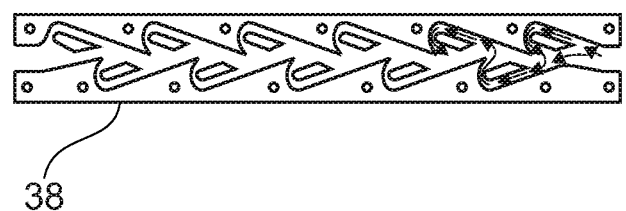
FIG. 14C shows a Tesla valve used in VSS channel.

Referring to FIGS.14A to 14C air orifice further can be formed by making a channel with a built-in tesla-valve 38 leading to the air ducts 31 protruding the skin 30 at the air orifice 40. The channel 38 will prevent high speed water entering air ducts 31 when executing high speed manoeuvres. The channel 38 should exit with 90-degree elbow perpendicular to the stream. Height and size of the protrusion 40 for the air injector may increase together with the size of the walls. When the nozzle's air supply is blocked by BDR control system—a local low-pressure area generated over the injector will act as additional drag/added stability to the hull/water connection for the area. BDR control system can adjust the drag from reduction (air generation) to promotion of drag (low pressure areas with air supply cut off). This allows for a better range of control during some high-speed maneuvers.

The channels with tesla valve 38 can be constructed at 90 degrees to the skin surface 30 or can be angled towards the stern 102. Pointing an outlet backwards reduces the risk of air bubbles fighting with a dynamic pressure generated by the marine vehicle's 100 movement.

VSS 11 can also enhance high-speed manoeuvring capabilities like high speed turns (both s-turns and 180° turns). VSS 11 will lubricate parts of the hull 10 that are moving at higher speed. It can assist in high speed manoeuvres (turns and doughnuts).

Operator can also "close" air supply to the VSS 11 on any side of the marine vehicle 100. At speed VSS 11 without air will act as local low-pressure areas that can anchor parts of the hull to the water for extra stability. VSS 11 are directional and will generate more bubbles when moving forward. If marine vehicle 100 starts to "loose grip" when executing a high-speed turn, VSS 11 will significantly decrease or stop bubbles generation. In case of a slide or spin-off because water stream will flow over/across VSS 11, rather than through them. This should allow hull 10 to "settle" and slow down if going in the wrong direction.

Air bubbles that are injected into the boundary layer need to overcome water pressure. For the properly designed BDR hull—this should be mostly static (water column) pressure for the depth of the air/bubbles injector. For the larger ships with significant draft BDR systems require air pressurization. When marine vehicle moves with a cruising speed—VSS 11 can generate negative pressure (suction) over air/bubbles injector. This can dramatically decrease or remove the need for air pressurization by BDR. That may reduce cost of equipment (compressor or charger) and operating expenses for BDR.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An array of venturi surface structures (VSS) for bubble drag reduction (BDR) to be placed on a hull of a marine vehicle, wherein the hull has a hull surface, a wetted area exposed to a water flow and a non-wetted area, a stern and a bow and a mid-hull between the stern and the bow, and wherein the wetted area is configured to generate a water flow distribution beneath the marine vehicle forming a local flow direction at each point on the wetted area, each VSS comprising:
   a) an air orifice on the hull surface to inject a stream of air bubbles into the water flow;
   b) a converging channel having a wider inlet and a narrower outlet attached onto the hull surface substantially along the local flow direction, the converging channel has a channel configuration comprising:
      i) a first wall attached to the hull surface forming a first attachment line, wherein the first attachment line has a first longitudinal angle with respect to the local flow direction passing through the air orifice, and a second wall attached to the hull surface forming a second attachment line, wherein the second attachment line has a second longitudinal angle with respect to the local flow direction passing through the air orifice, and wherein the narrower outlet is positioned around the air orifice;
      ii) each wall having a shape, a maximum height and a length;
      iii) the first wall extends outwardly at a first extensional angle with respect to the hull surface, and the second wall extends outwardly at a second extensional angle with respect to the hull surface;
   whereby the water flow, generated by a motion of the marine vehicle, enters into the wider inlet, exits the narrower outlet and generates a low pressure above the air orifice drawing air through the air orifice, which injects the stream of air bubbles along the hull surface, thereby as the water flow increases, the low pressure around the air orifice increases, resulting in the generation of more stream of air bubbles, and thereby improve bubble drag reduction.

2. The VSS of claim 1, wherein the first longitudinal and extensional angles are the same or different than the second longitudinal and extensional angles, respectively.

3. The VSS of claim 1, wherein the first and the second longitudinal angels are between 10 to 40 degrees to avoid generation of low pressure and highly turbulent zone over the VSS.

4. The VSS of claim 1, wherein the air orifice is made at the tip of a protrusion from the hull surface creating a smooth bump to generate an area of low pressure over the bump, thereby resulting a more efficient operation of the BDR.

5. The VSS of claim 1, wherein the first and the second extensional angles each are between 30-90 degrees.

6. The VSS of claim 1, wherein the maximum height of the first wall is the same or shorter than the maximum height of the second wall to control an up-flow of the stream and reduce an over-flow.

7. The VSS of claim 1, wherein the length of the first wall is the same or shorter than the length of the second wall to accommodate for highly non uniform flow regions that occur on the hull surface.

8. The VSS of claim 1, wherein the first wall has a first top and the second wall has a second top, and wherein the first top and the second top touch.

9. The VSS of claim 1, wherein the first and the second walls are curved extensionally forming a closed venturi channel.

10. The VSS of claim 1, wherein the channel has a flume shape with a converging diverging structure to accommodate for air lubrication for both in a forward moving and a backward moving marine vehicle.

11. The VSS of claim 1, wherein the shape of the first and the second walls are fin shape with a slowly increasing front height and a fast reducing back height.

12. The VSS of claim 1, wherein one or both walls have an actuator to fold or retract the wall to change the extensional angles of each wall, and to adjust the angle of the first wall with respect to the second wall, thereby changing the performance of the channels for various speed preferences of the marine vehicle, and wherein a controller regulates channel configuration to change the bubble injection by changing the water pressure around the air orifice.

13. The VSS of claim 12, wherein the actuator is a linear or a rotating actuator operated by a remote control or wiring control system to adjust the channel configuration for various speeds and conditions.

14. The VSS of claim 1, wherein the air orifice comprising of an air bubble generating nozzle having a nozzle design, and a nozzle injection angle to inject bubbles at a predefined angle into the water stream.

15. The VSS of claim 1, wherein the channel is attached on a skin that is a part of a hull or attached on the hull surface, wherein the skin comprises:

a) a thickness with a plurality of air ducts that extends in the thickness of the skin, wherein each air duct has a rectangular or circular or elliptical cross section;
b) each air duct extends from the non-wetted area to the wetted area;
c) the skin has an air-intake for each air duct to draw the air into the air ducts;
d) the skin has an outer layer, wherein a plurality of air orifice is formed on the outer layer of the skin and wherein the channels are attached on the air orifices, thereby the water flow enters said one or more channels and generates a low pressure that draws an air from the air ducts into the channels and wherein a plurality of air bubbles are formed in said stream of water, and wherein said plurality of air bubbles are carried in said stream of water and exit through said air/bubble outlet hole as a plurality of microbubbles.

16. The VSS of claim 15, wherein the skin is detachably fixed on the hull surface.

17. The VSS of claim 15, wherein each air-intake has a check valve or a tesla valve to control the amount of water entering the air ducts when marine vehicle is stationary or in high speed maneuvers.

18. The VSS of claim 15, wherein each air duct has an air intake cover to control the air distribution to each air duct within the skin.

19. The VSS of claim 1, wherein the array of VSS comprising of:
a) a first subarray of VSS placed near the bow, wherein each VSS of the first subarray of VSS has a first maximum height;
b) a second subarray of VSS randomly placed further downstream and near the mid-hull, wherein each VSS has a second maximum height, and
c) a third subarray of VSS near the stern that have a third maximum height,
whereby the maximum height of each VSS is configured to be comparable
with a thickness of a boundary layer at the area of placement of the VSS.

20. The VSS of claim 19, wherein for a small sailing boat, a speed boat, and a personal watercrafts at operating speeds of 2-15 knots, the first maximum height of each VSS is between 1-10 cm from the bow to the mid-hull and the second and the third maximum heights of VSS are between 10-15 cm from the mid-hull to the stern, and for large ships at operating speeds of 15-25 knots, the first maximum height of each VSS is between 1 cm-1m from the bow to the mid-hull, and the second and third maximum heights are between 1 m-3m from the mid-hull to the stern.

* * * * *